United States Patent Office 3,719,387
Patented Mar. 6, 1973

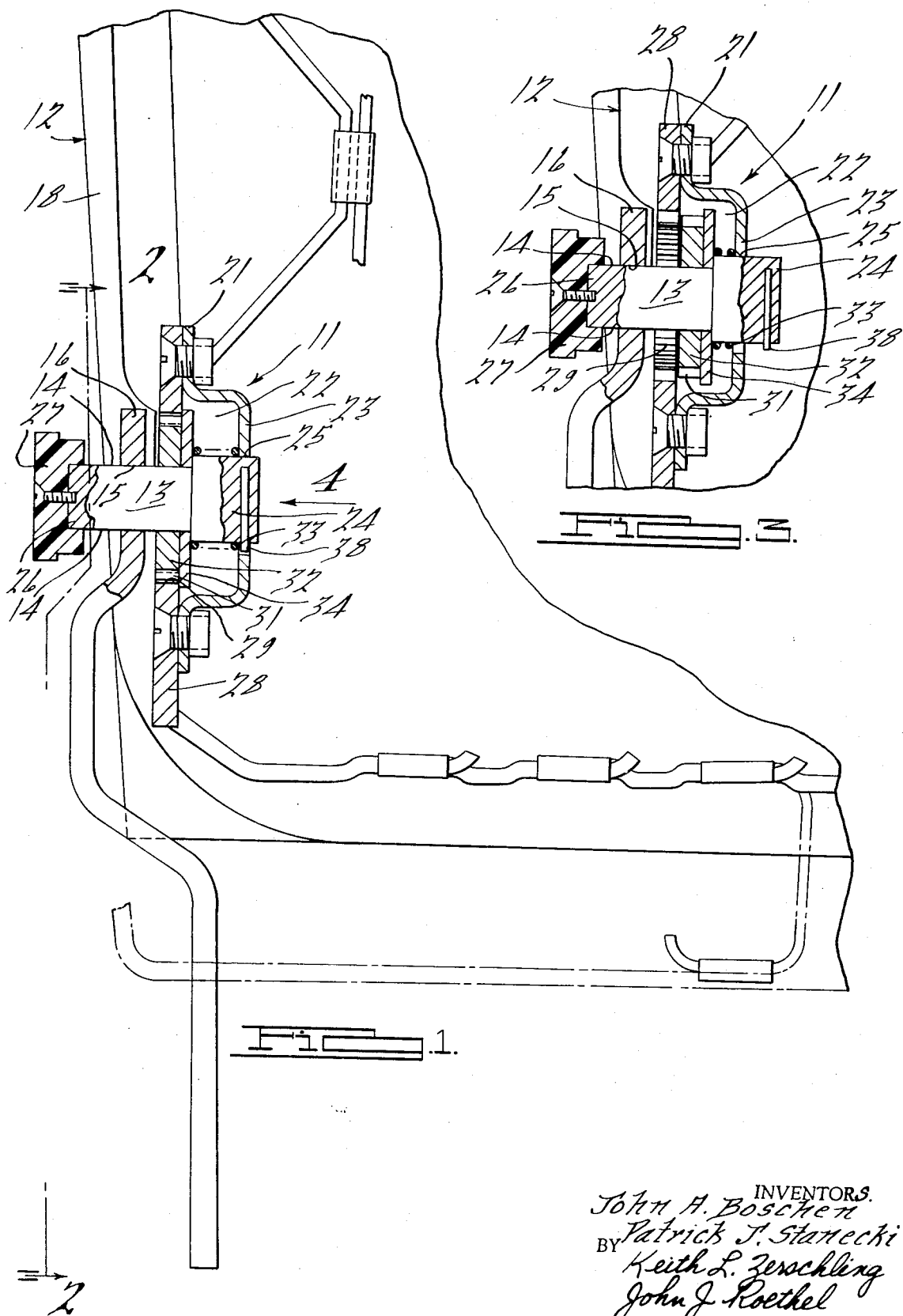

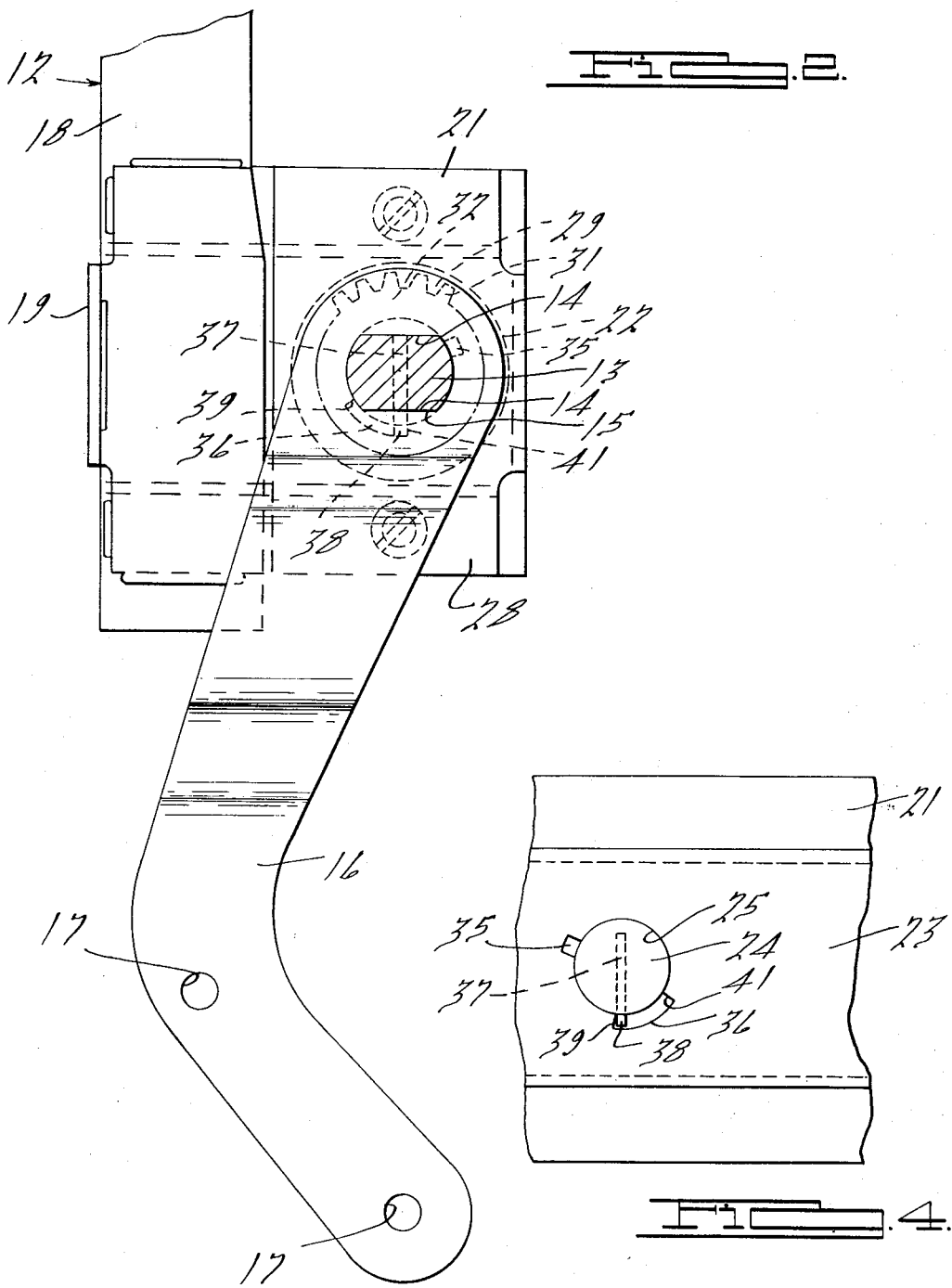

3,719,387
SEATBACK LATCH AND RECLINER MECHANISM
John A. Boschen, Royal Oak, and Patrick J. Stanecki, Allen Park, Mich., assignors to Ford Motor Company, Dearborn, Mich.
Filed Dec. 3, 1971, Ser. No. 204,499
Int. Cl. A47c 3/00; B60n 1/02
U.S. Cl. 297—355                    12 Claims

ABSTRACT OF THE DISCLOSURE

A seatback latch mechanism for a seatback frame pivotally supported on a seat frame for forwardly or rearwardly tiltable movement relative to the latter. The latch mechanism comprises a nonrotatable longitudinally shiftable shaft carrying a nonrotatably secured external gear means which meshes with an internal gear means to hold the seatback frame against tiltable movement. Longitudinal shifting of the shaft disengages the gear means permitting forward or rearward tilting movement of the seatback frame about the axis of the shaft, the latter being fixed relative to the seat frame. The mechanism includes indexing or locking means for controlling the gear means engagement positions and thereby the locking positions of the seatback frame relative to the seat frame.

BACKGROUND OF THE INVENTION

In conventional multi-purpose vehicles, more popularly known as station wagons, the second seats are constructed and arranged so that the seatback is forwardly foldable over the seat cushion. The back side of the seatback is covered with floor board paneling to form in the folded condition an extension of the cargo carrying floor board. This permits an increase of the cargo capacity of the vehicle at the expense, however, of the passenger carrying capacity.

Generally, the conventional construction and arrangement does not give the vehicle operator the option of tilting the seatback rearwardly to provide a seatback recliner.

It is an object of the present invention to provide a vehicle second seat construction and arrangement embodying a latch mechanism which permits the seatback frame to be tilted forwardly or rearwardly, as desired. When tilted forwardly the seatback frame permits the conventional extension of the vehicle floor board to increase the cargo carrying area and when tilted rearwardly the seatback frame becomes a recliner seatback. The latch mechanism provides for at least three seatback recliner adjustment positions.

SUMMARY OF THE INVENTION

The present invention relates to a seatback latch mechanism for a seatback frame pivotally supported on a seat frame for forwardly or rearwardly tiltable movement relative to the seat frame. The latch mechanism comprises a longitudinally shiftable shaft means nonrotatably journalled in an appendage to the seat frame. A control plate bracket means is mounted on the seatback frame. The mechanism includes external tooth gear means nonrotatably coupled to the shaft for shiftable movement with the latter and internal tooth gear means carried on the control plate bracket means having meshing engagement with the external tooth gear means to hold the seatback frame in preselected positions relative to the seat frame. The change from one position to another is accomplished by a longitudinal shift of the shaft in a direction to disengage the gear means whereby the seatback frame becomes freely swingable about the shaft axis. An indexing means controls the gear means engagement positions and thereby the locking positions of the seatback frame relative to the seat frame.

DESCRIPTION OF THE DRAWINGS

Further features and advantages of this invention will become more apparent as the description proceeds, particularly when considered in conjunction with the accompanying drawings, wherein:

FIG. 1 is a fragmentary view in part sectional illustrating the seatback frame structure, an element of the seat frame and the latch mechanism embodying the present invention;

FIG. 2 is a view in part sectional on the line 2—2 of FIG. 1;

FIG. 3 is a view in part similar to FIG. 1 illustrating the components of the latch mechanism in unlatched condition; and FIG. 4 is a view in the direction of the arrow 4 in FIG. 1.

DETAILED DESCRIPTION OF THE INVENTION

The seatback mechanism, generally designated 11, embodying the present invention is operatively associated with a seatback frame, a fragmentary portion 12 of which is shown, pivotally mounted on a seat frame (not shown).

The latch mechanism comprises a shaft 13 which is flatted at 14 on its upper and lower surfaces and fits through a complementary hole 15 in a support arm or appendage 16 which is adapted to be bolted through both holes 17 to a seat frame. In effect, shaft 13 is nonrotatably but slidably journalled in the appendage 16 for movement longitudinally or in the direction of its length.

Welded to a tubular member 18 of the seatback frame 12 is a control plate bracket means 19. The control plate bracket means 19 has a large plate portion 21 having a channel-shaped chamber or depression 22 defined by a bottom or base wall 23.

At one end, the shaft 13 has an enlarged cylindrical end portion 24 which projects through an aperture 25 in the base wall 23. At its other end 26, the shaft 13 carries a knob 27 outboard of the support arm or appendage 16. The knob 27 is used to push or pull the shaft 13 in longitudinal directions, for a purpose to be explained.

Bolted to the face of the plate portion 21 of the control plate bracket means 19 is a cover plate 28 having a central aperture the circumference of which has internal gear teeth 29.

The internal gear teeth 29 are adapted to mesh with the external teeth 31 of a spur gear 32 carried intermediate the ends of the shaft 13. The gear 32 is nonrotatably coupled to the shaft 13 and is adapted to be moved into and out of mesh with the internal gear teeth 29 upon the shaft 13 being slidably moved in longitudinal directions.

The function of the meshing gears may best be understood by reference to FIGS. 1 and 3 of the drawings. In FIG. 1, the gear teeth 31 on the spur gear 32 are shown in mesh with the gear 29 on the cover plate 28. Since the gear 32 is nonrotatably carried by the shaft 13 which in turn is nonrotatably carried by the appendage 16, the gear 32 is held against rotation. With the internal gear teeth 29 in mesh with the external teeth 31 on the gear 32, the backrest 12 is also held against pivotal movement about the axis of the shaft 13. Normally, such pivotal movement occurs because the enlarged portion 24 of the shaft 13 provides a bearing surface on which the control plate bracket means 19 supports the seatback frame. The wall of the aperture 25 in the base wall 23 of the channel 22 comprises this support means for the seatback frame on the enlarged portion 24 of the shaft 13.

In order to release the seatback frame for pivotal movement either forwardly or rearwardly, the knob 27 on the shaft 13 must be pushed inwardly to the right as viewed in FIG. 1. This results in a lateral disengagement of the teeth 31 of the spur gear 32 from the internal teeth 29 of the cover plate 28 causing the condition illustrated in FIG. 3 to be attained. As seen in FIG. 3, the spur gear 32 has been moved laterally into the chamber 22 out of mesh with the gear teeth 29 on the cover plate 28. In this condition, the seatback frame may be pivoted forwardly or rearwardly about the pivot axis of the shaft 13. Upon the release of manual pressure upon the knob 27, a coil spring 33 acting between a stop washer 34 and the inner surface of the base wall 23 of the chamber 22 drives the shaft 13 and the gear 32 carried thereon back into meshing relationship with the teeth 29 of the cover plate 28.

As will be noted from FIGS. 1 and 3, the spring 33 encompasses the large cylindrical end portion 24 of the shaft 13 and is compressed as the shaft is moved longitudinally from left to right as viewed in the drawings. The diameter of the stop washer 34 is such that it overlays the teeth 29 of the cover plate 28 and thus limits the restoration movement of the shaft 13 from right to left under the influence of the spring 33 when the manual pressure on the knob 27 is released.

An indexing means is provided to assist in locating the optimum positions of operation of the seatback relative to the seat. As best seen in FIG. 4, the aperture 25 in the base 23 of the chamber 22 of the control plate bracket means 19 is notched as indicated at 35 and 36. The enlarged end 24 of the shaft 13 carries a hardened pin 37 one end 38 of which projects beyond the periphery of the enlarged shaft portion 24. The pin end 38 normally is engaged in either the notch 35 or 36 except when the shaft 13 has been longitudinally shifted to the right, as viewed in the drawings. In this case the pin end 38 is disengaged from either notch.

When the pin end 38 is engaged with the notch 35, the seatback frame is tilted forwardly over the seat cushion and the floor paneling carried on the back of the seatback frame lies in a coplanar relationship with the flooring in the station wagon. When the pin end 38 is in engaged relationship to the end 39 of the notch 36 as shown in FIG. 4, this corresponds to a normal upright position of the seatback frame in which passengers may utilize the station wagon second seat for seating purposes. If the pin end 38 is in engagement with the end 41 of the notch 36, this corresponds to a maximum recliner position for the seatback frame. One intermediate position is obtainable in which the pin end 38 would be half way between the ends 39 and 41 of the slot 36. This corresponds to an intermediate angle of recline for the seatback frame and is obtained by the intermeshing of the gear teeth 29 and 31. Preferably, the distance between the notch ends 39 and 41 permits a maximum angular seatback recline for the seatback frame of 47 degrees.

To briefly recapitulate the operation of the latch mechanism, if it is desired to tilt the seatback frame in a direction to overlie the seat frame so that the floorboard paneling on the back of the seatback frame can achieve a coplanar relationship with the floor board, it is necessary to push the knob 27 to cause the shaft 13 to be moved from left to right as viewed in FIG. 1. This causes the gear teeth 31 to become disengaged from the gear teeth 29. The relationship of the parts following such disengagement is shown in FIG. 3. Once the gear teeth have become disengaged, it is only necessary to grasp the upper end of the seatback frame and pull the same forwardly over the seat cushion. The knob 27 may be released upon the full down position being approached since the spring 33 is waiting to force the respective gear teeth 31 and 29 into mesh and at the same time to urge the pin end 38 into engagement with the notch 25 thereby further locking and indexing the seatback frame in its desired position. The same mode of operation is used to make a recliner seatback except that upon release of the gears it is necessary to push the seatback frame in the reclining direction rather than forwardly over the seat cushion frame.

It is to be understood that the invention is not limited to the exact construction illustrated and described above, but that various changes and modifications may be made without departing from the spirit and scope of the invention as defined by the following claims.

What is claimed is:

1. A seatback latch mechanism for a seatback frame pivotally supported on a seat frame for forwardly or rearwardly tiltable movement relative to the latter, the latch mechanism comprising a longitudinally shiftable shaft means nonrotatably journalled in an appendage to the seat frame, a control plate bracket means mounted on the seatback frame, external tooth gear means nonrotatably coupled to the shaft for shiftable movement with the latter, internal tooth gear means carried on the control plate bracket means having meshing engagement with the external tooth gear means to hold the seatback frame in preselected positions relative to the seat frame, the change from one position to another being accomplished by a longitudinal shift of the shaft in a direciton to disengage the gear means whereupon the seatback frame becomes freely swingable about the shaft axis, and indexing means for controlling the gear means engagement positions and thereby the locking positions of the seatback frame relative to the seat frame.

2. A seat back latch mechanism according to claim 1, in which:

one end of the shaft has a manually engageable portion upon which pressure may be exerted to shift the shaft longitudinally.

3. A seatback latch mechanism according to claim 2, in which:

the other end of the shaft has an enlarged cylindrical portion on which the control plate bracket means has bearing engagement to support the tiltable movement of the seatback frame.

4. A seatback latch mechanism according to claim 3, in which:

the control plate bracket means has a chamber having a base wall, the enlarged cylindrical portion of the shaft projecting through a bearing aperture in the base wall.

5. A seatback latch mechanism according to claim 4, in which:

the indexing means is interposed between the enlarged cylindrical portion of the shaft and the base wall of the chamber of the control plate bracket means.

6. A seatback latch mechanism according to claim 1, in which:

the shaft has an enlarged cylindrical portion on which the control plate bracket means has bearing engagement to support the tiltable movement of the seatback frame.

7. A seatback latch mechanism according to claim 6, in which:

the control plate bracket means has a chamber having a base wall, the enlarged cylindrical portion of the shaft projecting through a bearing aperture in the base wall.

8. A seatback latch mechanism according to claim 7, in which:

the indexing means is interposed between the enlarged cylindrical portion of the shaft and the base wall of the chamber of the control plate bracket means.

9. A seatback latch mechanism according to claim 8, in which:
    the external tooth gear means is positioned intermediate the ends of the shaft and upon disengagement from the internal tooth gear means is moved into the chamber of the control plate bracket means.

10. A seatback latch mechanism according to claim 9, in which:
    a compression spring means encompasses the shaft within the chamber of the control plate bracket means,
    the spring means resisting longitudinal shift of the shaft in gear means disengagement direction.

11. A seatback latch mechanism according to claim 1, in which:
    the external tooth gear means is positioned intermediate the ends of the shaft and upon disengagement from the internal tooth gear means is moved into the chamber of the control plate bracket means.

12. A seatback latch mechanism according to claim 11, in which:
    a compression spring means encompasses the shaft within the chamber of the control plate bracket means,
    the spring means restricting longitudinal shift of the shaft in gear means disengagement direction.

References Cited
UNITED STATES PATENTS

| | | | |
|---|---|---|---|
| 3,514,155 | 5/1970 | Close | 297—379 |
| 3,423,785 | 1/1969 | Pickles | 297—374 X |
| 3,338,633 | 8/1967 | Jackson | 297—367 X |

CASMIR A. NUNBERG, Primary Examiner

U.S. Cl. X.R.

296—66; 297—364, 379